Figure 1:
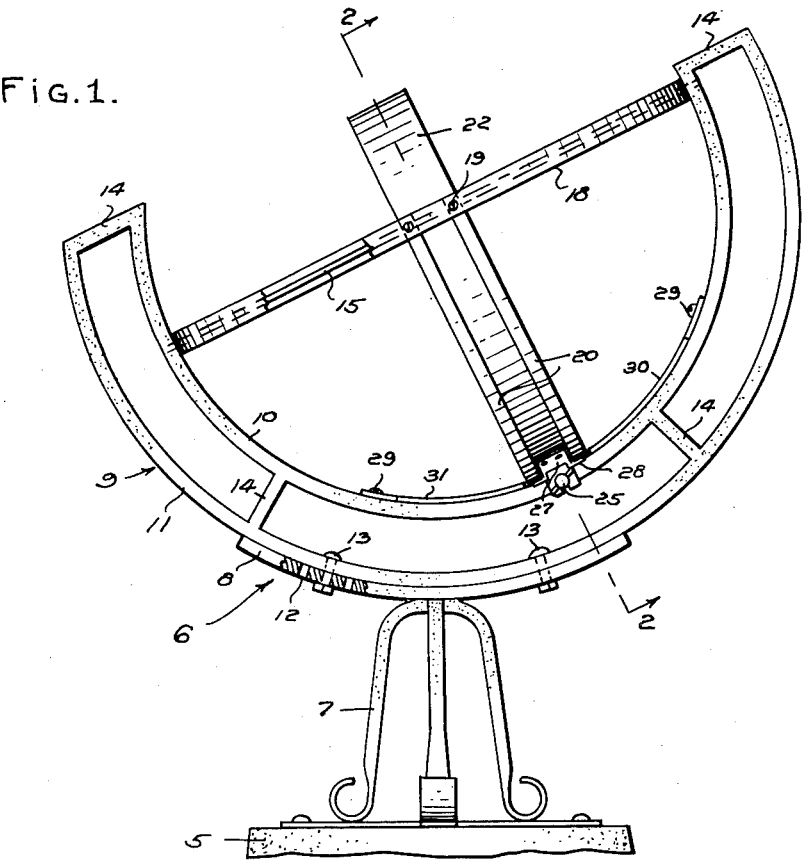

July 17, 1956     F. W. SUNDBLAD     2,754,593
SUN DIAL

Filed May 20, 1954     2 Sheets-Sheet 1

INVENTOR.
FOLKE W. SUNDBLAD,
BY
ATTORNEY.

July 17, 1956 F. W. SUNDBLAD 2,754,593
SUN DIAL
Filed May 20, 1954 2 Sheets-Sheet 2

INVENTOR.
FOLKE W. SUNDBLAD,
BY
ATTORNEY.

United States Patent Office 2,754,593
Patented July 17, 1956

2,754,593
SUN DIAL
Folke W. Sundblad, Fort Lauderdale, Fla.

Application May 20, 1954, Serial No. 431,021

3 Claims. (Cl. 33—62)

This invention relaets to improvements in sun dials and has particular reference to a sun dial of the armillary type.

The invention contemplates a sun dial of the armillary type that is ornamental in design and extremely simple to operate and serves to make this ancient time-piece not only useful, from the standpoint of correct time reading, but also an attractive outdoor ornament that lends itself readily to an extremely interesting addition to the garden, swimming pools, etc.

Since the main reason for the lack of interest in and use of sun dials on the part of the average individual is, that the operation of the present type of sun dials involves difficult adjustments and cumbersome calculations in regard to latitudes, longitudes and daylight saving time zones, all of which is beyond the ability of the average individual, and the primary object of this invention is therefore to eliminate almost entirely these objectionable features without impairing the accuracy and usefulness of the sun dial. This objective is achieved by taking advantages of the fact that a sun dial becomes, as a rule, a stationary fixture once it has been installed in one location and, by having the data on the longitude, latitude and daylight saving time regulations of the particular location, the sun dial can be delivered to the customer in a pre-set condition, that is, the angle between the gnomon and the horizontal plane will correspond to that of the latitude of the location in question, and the chart showing the equation of time will be attached to the frame in such a manner that the mean of the chart will correspond to the local meridian of the user, and, if need be, to the local daylight saving time. In this pre-set condition, the only problem left unsolved to the user is to place the dial on a suitable rigid base in such a manner that the plane of the gnomon is in north-south direction, in which position the gnomon will point at the North Star.

With the foregoing and other objects in view, which will become more apparent as the nature of the invention is better understood, the same consists of a sun dial of the armillary type embodying novel features of construction, combination and arrangement of parts as will be hereinafter more fully described, illustrated in the accompanying drawings and defined in the appended claims.

Figure 2:
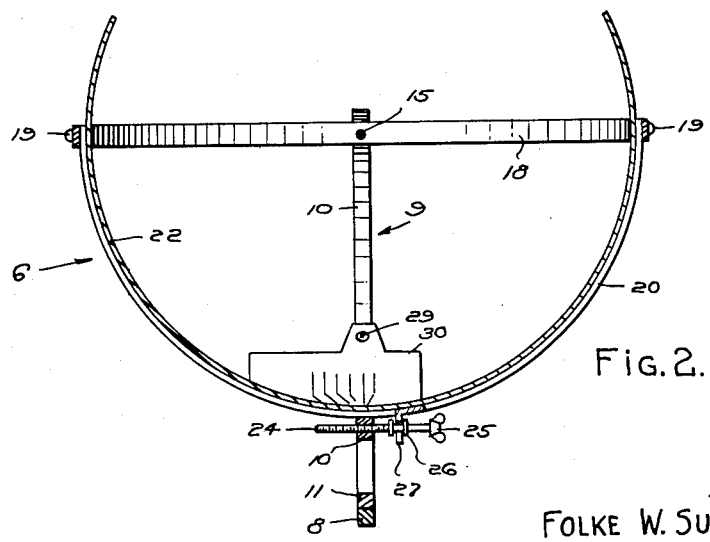
Figure 3:
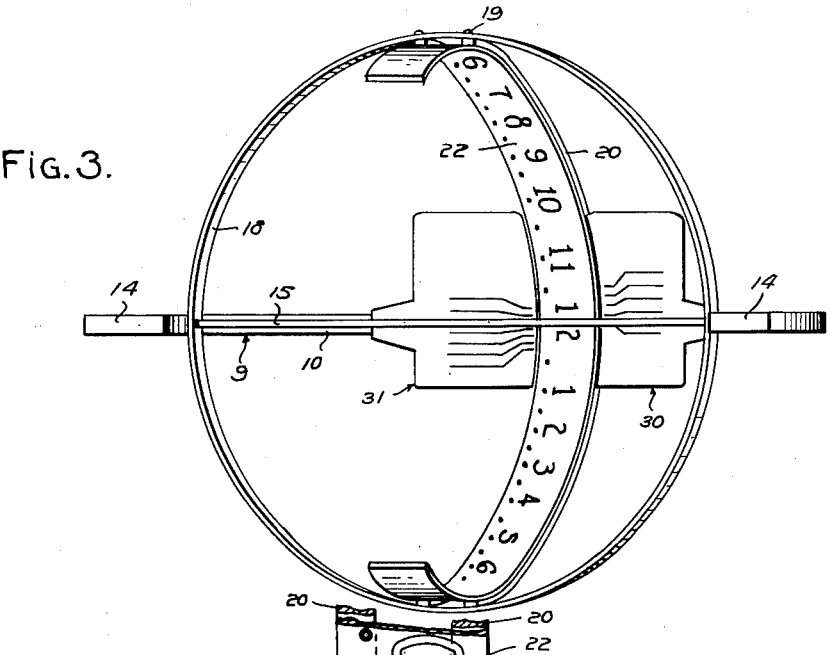
Figure 4:
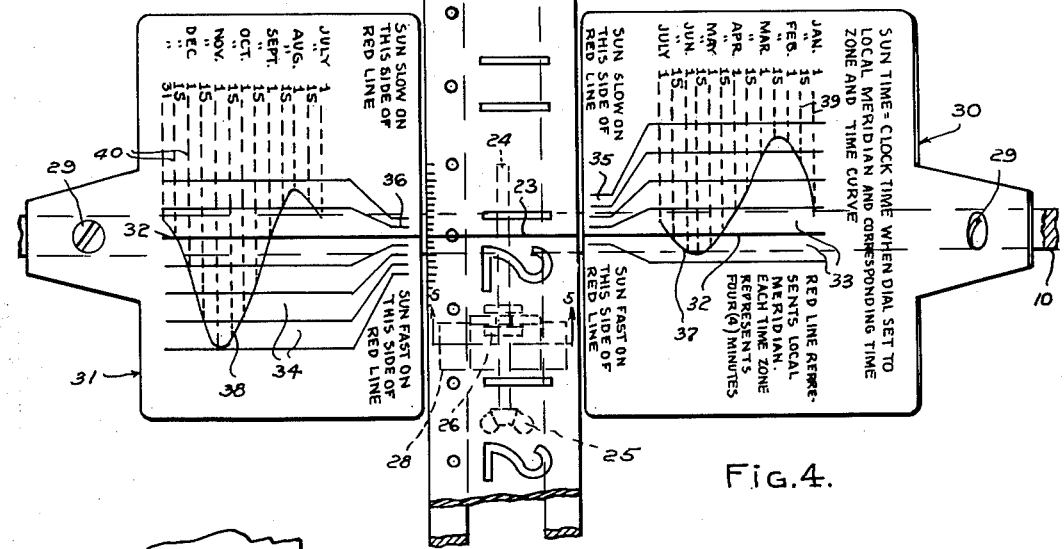
Figure 5:
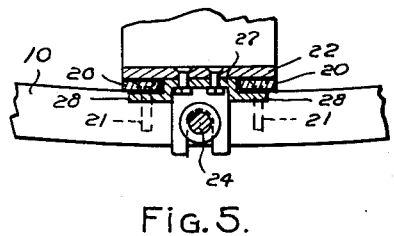

In the drawings:

Figure 1 is a side elevation of a sun dial constructed in accordance with the invention, parts being broken away for sake of clearness, Figure 2 is a section view, taken on line 2—2 of Figure 1, Figure 3 is a top plan view of the device, Figure 4 is an enlarged fragmentary top plan view of fixed charts and an associated time band and, Figure 5 is a sectional view taken on line 5—5 of Figure 4, illustrating guide means for the time band in association with fixed trackways.

Referring specifically to the drawings, the numeral 5 designates a rigid base for the mounting and fixed support of the sun dial, to be described. The base or pedestal 5 may be formed of any desirable material, such as concrete, metal or the like and having a height which will support the sun dial at an elevation convenient for reading.

The sun dial, indicated as a whole by the numeral 6, embodies an ornamental and preferably metallic base 7, that is rigidly bolted or otherwise fixed upon the base 5. It is desirable, in view of the outdoor use of this invention, that the major portion of the sun dial, including the base 7, shall be formed of wrought iron having a low carbon content in order to minimize any tendency to rust. The base 7 has welded or otherwise rigidly connected thereto, a curved bar 8, preferably substantially square in cross-section.

Adjustably connected upon the bar 8, parallel thereto, is an arcuate frame 9, including inner and outer spaced apart bars 10 and 11. The bars 10 and 11 are concentric with respect to each other and concentric with respect to the bar 8. The bar 8 is provided with spaced apart holes 12, for the passage of connecting bolts 13 carried by the bar 11 and serves as the medium whereby the frame 9 may be angularly adjusted and fixed with respect to the base 7 by the manufacturer after determining the latitude of the user. The holes 12 may be eliminated and the bar 8 slotted for this adjustment. The frame member 9 and its bars 10 and 11 are connected intermediate their ends and at their ends, by cross bars 14 welded thereto, whereby the frame 9 constitutes a rigid ornamental member of the sun dial.

Spanning the frame 9 on its axial center line, is a gnomon rod 15, the opposite ends of which pass through and are anchored in aligned apertures formed in the bars 10 and 11.

A band 18, apertured at diametrically opposite points, is engaged with the gnomon rod 15 and lies in the same plane as the gnomon rod. The band 18 has an abutting engagement with the inner side of the bar 10. Rigidly connected with the band 18 at diametrically opposite sides, as at 19, are a pair of spaced apart semi-circular tracks 20. The tracks 20 are formed on an arc having a diameter substantially identical to the diameter of the band 18 and with the tracks being arranged at a right angle to the gnomon and the band 18. The tracks 20, intermediate their ends have resting engagement upon the inner bar 10 and are rigidly connected to such bar through the medium of screws or rivets, as indicated in Figure 5, as at 21.

A time band 22, of semi-circular form, is concentric to and has riding engagement upon the tracks 20. The opposite ends of the time band 22 in the intermediate setting, extend above the band 18, as clearly shown. The inner face of the time band 22 is provided with a transverse meridian line 23, that bisects the numeral 12. The time band 22 is divided into the hours of daylight with the numerals 1 to 8 being disposed to the right of the numeral 12 at one hour spacing and with the numerals 11 to 8 being disposed to the left of the numeral 12 at one hour spacing. The several time numerals may be printed, etched or otherwise impressed upon the time band in a relatively large size and the individual hourly spacing may be subdivided into half hours and minutes for a more accurate determination of the time as indicated by the shadow of the gnomon rod 15 passing thereacross. It becomes necessary, in order that the device be readable in an accurate manner, that the time band be adjustable within limits to compensate for a slow sun time or a fast sun time and whereby the meridian line 23 may be moved for such purpose. To provide for the necessary adjustment of the time band, there has been provided an adjusting screw 24, threadedly engaged within a threaded opening formed in the bar 10, transversely thereof. The screw 24 is extended to one side of the bar 10 and is provided with a preferably winged head 25.

Inwardly of the head 25, the screw is provided with a pair of spaced apart collars 26 that engage upon opposite sides of a forked bracket 27, that is riveted or otherwise rigidly connected to the underside of the time band 22. The forked bracket 27 engages over the screw 24 between the collars 26. It will thus be apparent that, when the screw is rotated, the bracket 27 and the band 22 will be rotated upon the tracks 20. The bracket 27 is provided with lateral lip portions 28, that underlie the tracks 20 to prevent lateral movement of the time band and to maintain the band in accurate riding engagement with the tracks.

Disposed upon opposite sides of the time band and rigidly connected to the frame bar 10, as by screws 29, are a pair of time determining charts 30 and 31. Each of the charts 30 and 31 is designed to divide the equation of time curve into a number of enlarged time zones of equal size and with a set of convergent connecting lines to reduce the zones to a scale which corresponds to the time graduation to true angular scale on the time band. Each of the charts 30 and 31 is divided longitudinally by a colored meridian line 32, corresponding to the meridian line 23 of the time band. The charts are further divided longitudinally and upon opposite sides of the meridian line 32, into a plurality of time zones of equal width and paralleling the meridian line. Each time zone, denoted by the reference numerals 33 and 34 of the two charts, is equal to four minutes and the lines forming the time zones are extended inwardly toward the time band and reduced to scales 35 and 36, corresponding to the scale in minutes upon the time band. The scale band can thus be set so that the line 23 is at a point on the true reduced scale 35 or 36 determined by the time of year. Since each time zone 33 and 34 represents a major time variation, it follows that the conversion from sun time to clock time can be achieved with reasonable accuracy by only a few adjustments of the time band during the entire year. The chart 30, as clearly seen, covers the period from January 1 to July 1, while the chart 31 covers the period from July 1 to December 31. Each of the charts is further provided with a time curve 37 and 38 that represents the standard clock time and, as will be seen, each indicated monthly period intersects the curves by dotted lines 39 and 40. Thus, the operator in setting the time band can easily follow downwardly from the intersected part of the curve to the reduced scales 35 and 36 to obtain a substantially accurate setting for line 23 at any time of the year. The time band is obviously adjusted to the point where its meridian line 23 is in alignment with that portion of the reduced scales corresponding to the period of the year and the exact point upon the curve, when the curves are being employed. The placement of the time band between the two charts thus forms the division between the first and second halves of the year.

In use, the customer orders the sun dial from the manufacturer and, since the manufacturer is equipped to determine the local latitude and longitude and the particular time zone, the frame is pre-set at the factory accordingly by means of the bolts 13, thus accurately determining the setting and angularity of the gnomon. The hour band and the charts are preferably installed and the device shipped in a condition that only requires the proper setting upon the pedestal 5 in north and south direction. The device may be properly set with the aid of a compass or, a more simplified means may be employed that consists of placing a short section of pipe against the side of the frame 9 to rest upon the band 18 and to lie parallel with the gnomon rod 15. Then by sighting through the pipe to the North Star, with the base 7 resting upon the pedestal, the dial can be accurately positioned. Obviously, this would be done at night when the North Star is visible. After determining the position, the pedestal is marked in accordance with suitable apertures formed in the base 7 and the device then securely anchored permanently in position. The operator then determines the period of the year and, by adjusting the screw 24, shifts the time band 22 to cause its meridian line 23 to align with the appropriate division of the reduced scale 35 or 36. If the time within the degree of four minutes variation is unsatisfactory, then the line 23 is merely more precisely positioned between divisions of the scale 35 or 36. This is determined of course in accordance with the particular time zone that is bisected by the curve for the particular time of year. When exact time is desired, the operator shifts the time band to a degree to coincide with the degree of intersection of the curve with respect to the time zone. Thus, the device can be easily and accurately adjusted to determine sun time in accordance with clock time. After setting the time band, the time will be determined upon the time band by the shadow cast thereon by the gnomon rod.

It will be apparent from the foregoing that a very simple and accurate means has been provided for determining standard time in a sun dial of the armillary type. The structure is strong, durable, ornamental in appearance and has a wide range of use. The device requires no adjustments other than the time band and has been previously set as to the angularity of the gnomon, thus avoiding lengthy and difficult computations by the purchaser.

It is to be understood that while a preferred form of the device has been illustrated and described, changes are contemplated as readily fall within the spirit of the invention as determined by the scope of the subjoined claims.

Having described my invention, what I claim as new and desire to secure by Letters Patent is:

1. A clock time sun dial of the character described that comprises a base for rigid mounting support upon a pedestal, a quadrant frame that is adjustably mounted upon the base, and with the frame being vertically disposed and having a fixed angle corresponding to the meridian, a gnomon rod that is fixed in and spans the frame along the meridian line and with the rod being angled in accordance with the latitude, a band disposed within the frame and angled to be parallel with the gnomon rod, an hour time band arranged at a right angle to the first named band and with the hour band being semi-cylindrical in form and having an adjustable support upon the frame, trackways that are fixed with respect to the frame and with the first named band and which constitute a guiding support for the time band, adjustable means for shifting the time band upon the trackways, fixed time charts that are fixed with respect to the frame and which are arranged upon opposite sides of the time band whereby the time band provides a division between the first and second halves of the year, each of the charts and the time band being provided with meridian lines, each of the charts being divided to form a plurality of relatively wide and parallel time zones and a corresponding number of relatively narrow time zones, the wide zones adjacent to the time band being convergent whereby to reduce the narrow time zones to a scale of minutes that corresponds to a scale of minutes upon the time band, the said wide time zones being intersected by an equation of time curve; the adjusting means for the time band having means for maintaining the time band in positive guiding engagement with the trackways and with its scale of minutes in selected registry with the narrow time zones.

2. The sun dial according to claim 1, wherein the first named band is cylindrical in shape and apertured at diametrically opposite points for the reception of the gnomon, the trackways being spaced apart and curved throughout their length and with their terminal ends fixed with respect to the first named band and with the trackways being rigidly connected to the quadrant frame whereby the first named frame is fixed against movement with respect to the quadrant frame, the time band having a bracket connected thereto adjacent the frame, screw means that has threaded engagement with the frame and a non-threaded engagement with the bracket whereby the time band may be caused to traverse the trackways under the influence of the movement of the screw, the said bracket having lateral extensions that underlie the trackways to maintain the time band in traverse engagement, the time band being divided into hours and minutes throughout its length and with the meridian line being intermediate the length of the band, each of the charts being printed to indicate the months of one-half of the year and with the months having projecting lines that intersect the wide time zones and that intersect the equation of time curve.

3. The sun dial according to claim 1, wherein the time charts are arranged upon opposite sides of the time band with their inner edges lying closely adjacent the opposite edges of the time band whereby the meridian line of the time band can be accurately adjusted to a particular point of the reduced scale of minutes, the wide time zones of each chart being intersected by the said curve denoting equation of time whereby the meridian line of the time band can be accurately adjusted with the reduced scale of minutes to a degree corresponding to the point of intersection of the curve in accordance with the particular period of the year.

References Cited in the file of this patent

UNITED STATES PATENTS

| | | |
|---|---|---|
| 1,146,412 | Early | July 13, 1915 |
| 1,629,238 | Terraz | May 17, 1927 |
| 2,192,750 | Mead | Mar. 5, 1940 |